March 15, 1966   K. E. STROUP ETAL   3,240,003
SELF-REGULATING LIQUID REMOVAL SYSTEM
Filed Feb. 28, 1962

INVENTORS
KENNETH E. STROUP
ROBERT M. HANDLEWICH
BY Charles Q Warren
ATTORNEY 3,240,003
SELF-REGULATING LIQUID REMOVAL SYSTEM
Kenneth E. Stroup, Windsor, and Robert M. Handlewich, Bristol, Conn., assignors to United Aircraft Corporation, East Hartford, Conn., a corporation of Delaware
Filed Feb. 28, 1962, Ser. No. 176,504
3 Claims. (Cl. 55—408)

The present invention relates to a system for removing liquid from a gas stream with which the liquid is mixed and is particularly adapted to a gravity-free environment. The invention described herein was made in the performance of work under a NASA contract and is subject to the provisions of the National Aeronautics and Space Act of 1958, Public Law 85–568 (72 Stat. 426; 42 U.S.C. 2451), as amended.

Where a liquid separator is located in a conduit carrying gas with liquid mixed therein one of the problems is to remove from this separator a part of the liquid accumulating without the removal of all of it. One feature of the invention is a liquid pumping system which will maintain a predetermined amount of liquid within the separator.

In a gravity-free environment the pumped liquid must be stored in a closed container and accordingly, for space reasons, the pump should remove only liquid without pumping any gas from the separator. One feature of the invention is an arrangement to prevent pumping of gas from within the centrifugal separator.

Other features and advantages will be apparent from the following description taken in connection with the accompanying drawings.

Figure 1:
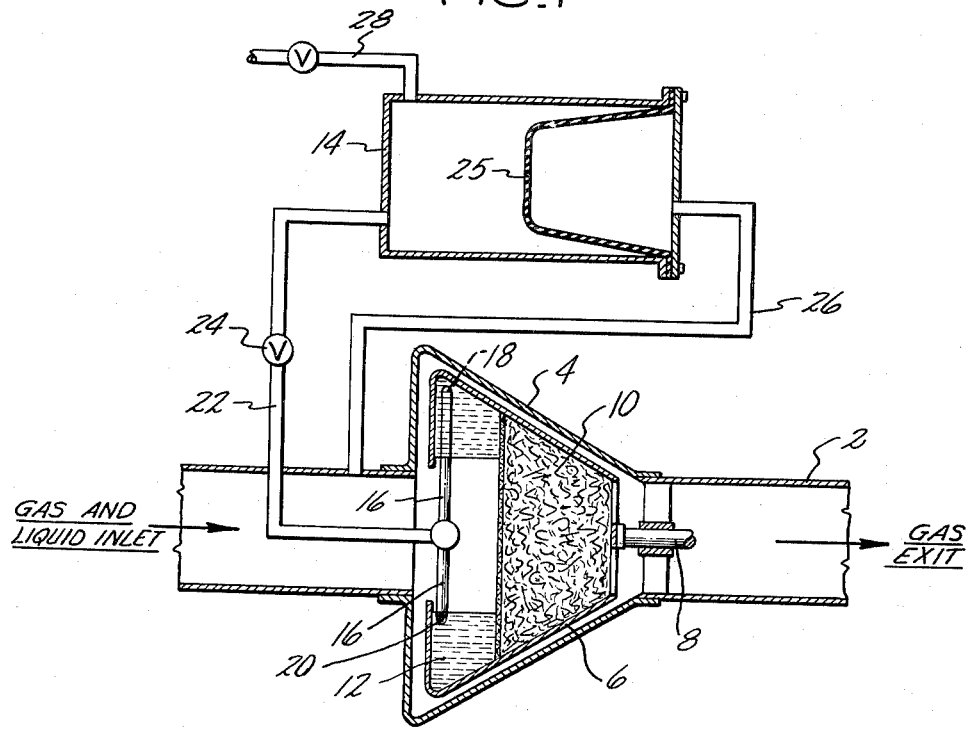
Figure 2:
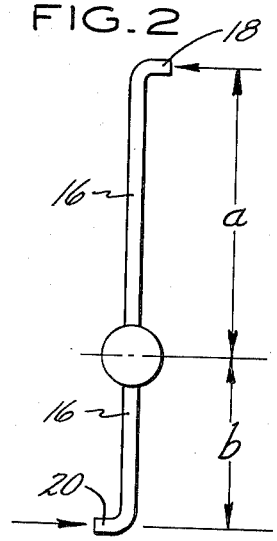

FIG. 1 is a schematic view of a liquid removal device.
FIG. 2 is a detail of the pumping tube.

Referring first to FIG. 1 the device is shown as applied to the removal of liquid from a conduit 2 carrying a mixture of gas and liquid. Positioned within the enlargement 4 in the conduit is a centrifugal separator 6 supported within the duct on a shaft 8 which is suitably driven to spin the separator at a suitable speed. The separator is in the form of a frustum of a cone which is filled in part with a wire mesh screen 10 on which the liquid from the stream of gas and liquid will collect. As the separator rotates the liquid is carried against the wall of the separator by centrifugal force to form an annular pool 12 at the largest diameter of the separator.

The liquid collecting in the pool 12 is removed and delivered to a storage tank 14 by a collector tube 16 positioned in fixed relation within the centrifugal separator. The collecting tube has opposed tube ends 18 and 20 thereon which extend tangentially of the annular pool 12 and are faced in such a direction that the liquid within the pool will be carrier into these tube ends as the separator rotates. That is to say, the tube ends face in a direction opposite to the direction of motion of the liquid as the separator rotates. The tube end 18 is separated a greater distance from the axis of the separator than is the tube end 20, but so long as both tube ends are submerged in the liquid they will function to pump liquid through the tube 16 and thence to a conduit 22, FIG. 1, into the storage tank 14. As the liquid level recedes so that the tube end 20 is radially inward of the surface of the liquid so that this tube end is exposed to the gas, liquid stops flowing into the storage tank. It will be apparent that this will occur since the pressure head exerted by the gas on the tube end 20 is negligible compared to the dynamic head of the liquid so that any liquid entering the tube end 18 will flow through the tube 16 and back to discharge through the tube end 20. Accordingly, once the liquid level reaches the tube end 20, no further pumping will occur and no gas will be pumped into the storage tank. Obviously as liquid collects in the pool and raises the liquid level to cover the tube end 20, the tubes will again begin to pump liquid into the tank.

A suitable check valve 24 in the conduit 22 prevents a back flow from the tank.

The storage tank 14 is a conventional accumulator with a transverse diaphragm 25 therein which is exposed on one side to the liquid to be stored and is exposed on the other side to a balancing pressure which is, in this case, the gas entering this end of the tank through a conduit 26 between the tank and the gas conduit 2 upstream of the separator. In this way the pumping device pumps only against the gas pressure existing in the duct. A suitable drain 28 may be provided for the storage tank.

It will be apparent that a liquid removal system of this character functions for pumping the liquid only when there is a necessity for liquid to be pumped and is accordingly self regulating. In this way no control devices are necessary and the pump is actuated in response to the accumulation of liquid within the centrifugal separator.

It is to be understood that the invention is not limited to the specific embodiment herein illustrated and described and may be used in other ways without departure from its spirit as defined by the following claims.

We claim:
1. The combination of a duct having an enlargement therein, said duct having a longitudinal axis, said enlargement containing a centrifugal separator for removal of liquid entrained in gas flowing in said duct, said separator including an open ended hollow rotary frusto-conical element, said element being coaxially and rotatably mounted in said duct enlargement, an inwardly extending flange at the larger end of said element, said flange and said element defining an annular space within said element at the larger end of said element for the collection of liquid, a porous mass disposed within said element adjacent its smaller end, said mass peripherally engaging the interior surface of said element so that gas with entrained liquid flowing through said element must pass through said mass and so that the liquid in said gas is entrained in said mass to be carried by centrifugal force into the annular space as the element rotates, and means for removing liquid from the annular space including a fixed tube having an outlet portion coaxial with said duct, said outlet portion being disposed within the larger end of said element, said tube having a first arm extending from, connected to, and fluidly communicating with said outlet portion to said annular space, said tube having a second arm extending from, connected to, and fluidly communicating with said outlet portion to said annular space, said first and second arms disposed approximately 180° apart about the axis of the duct, said first arm being longer than said second arm, and said first and second arms having inlet portions extending at right angles to said first and second arms so that the inlet portion extends tangential to the annular space and in a direction opposite to the direction of rotation of the frusto-conical element.

2. A device as in claim 1, said tube outlet portion being in communication through a first conduit with a diaphragm-type accumulator, said accumulator comprising a tank with a flexible diaphragm therein forming first and second chambers, one chamber on each side of the diaphragm, said first chamber communicating with said tube outlet portion through said first conduit and receiving the discharge from said tube outlet portion, and said second chamber communicating with said duct through a second conduit.

3. The combination of a centrifugal separator including a hollow rotary element at least a portion of the periphery being frusto-conical, means for supporting said element for rotation on an axis coinciding with that of the frusto-conical portion, an inwardly extending flange at the larger end of the frusto-conical portion defining an annular space within said element at the larger end for the collection of liquid in an annular pool in said space as the element rotates, means for introducing liquid to said annular space, and means for removing liquid collected in the annular space and to maintain a selected surface level of liquid therein at a predetermined radius from said axis of rotation, said means including a fixed tube coaxial with said element through which the liquid is discharged, said tube having, adjacent the larger end of the element, first and second hollow arms extending from said tube into said annular space, each of said first and second arms having an inlet portion at its outer end extending substantially at right angles to the arm so that it extends substantially tangential to the annular space, said open ends extending in a direction opposite to the direction of rotation of the frusto-conical element, said inlet portion on said first arm being at a greater radius from said axis than the predetermined radius of the surface of the liquid in the annulus and said inlet portion on the second arm being at a lesser radius from said axis than the predetermined radius of the surface of the liquid, said hollow arms communicating with said fixed tube and intercommunicating with each other where they communicate with the tube.

References Cited by the Examiner

UNITED STATES PATENTS

| | | | |
|---|---|---|---|
| 536,444 | 3/1895 | Reid | 233—22 |
| 881,723 | 3/1908 | Scheibe | 233—28 |
| 893,299 | 7/1908 | Bellany | 233—2 |
| 1,242,560 | 10/1917 | Kingsbury | 233—22 |
| 1,580,380 | 4/1926 | MacDonald | 55—400 |
| 1,694,666 | 12/1928 | Pease | 55—403 |
| 1,754,774 | 4/1930 | Sharples | 233—220 |
| 1,970,693 | 8/1934 | Fischer | 233—28 |
| 2,058,026 | 10/1936 | MacCallum | 233—2 |
| 2,192,589 | 3/1940 | Schmitz | 233—22 |
| 2,539,896 | 1/1951 | Dalrymple | 55—400 |
| 2,593,278 | 4/1952 | Edwards | 233—22 |
| 2,594,445 | 4/1952 | Keith | 233—2 |
| 2,648,496 | 8/1953 | Cresswell | 233—22 |
| 2,862,658 | 12/1958 | Dahlgren | 233—46 |
| 2,881,974 | 4/1959 | Ruf | 233—45 |
| 3,026,966 | 3/1962 | Asklof | 55—277 |
| 3,126,263 | 3/1964 | Schwab | 55—408 |

FOREIGN PATENTS

| | | |
|---|---|---|
| 211,288 | 9/1960 | Austria. |
| 572,830 | 11/1958 | Belgium. |
| 572,914 | 11/1958 | Belgium. |
| 571,215 | 1/1924 | France. |
| 924,143 | 3/1947 | France. |
| 1,034,371 | 4/1953 | France. |
| 375,634 | 5/1923 | Germany. |
| 421,075 | 11/1925 | Germany. |
| 132,586 | 9/1919 | Great Britain. |
| 285,928 | 2/1928 | Great Britain. |
| 117,242 | 4/1958 | Russia. |

HARRY B. THORNTON, *Primary Examiner.*